Oct. 29, 1963 W. D. MacDONNELL ETAL Re. 25,469

METHOD OF PRESERVING REFRACTORY MATERIALS

Original Filed Dec. 22, 1958

INVENTORS
WILFRED D. MacDONNELL
ALBERT D. SHATTUCK
BY Shanley & O'Neil
ATTORNEY

United States Patent Office

Re. 25,469

Reissued Oct. 29, 1963

25,469

METHOD OF PRESERVING REFRACTORY MATERIALS

Wilfred D. MacDonnell and Albert D. Shattuck, Dearborn, Mich., assignors to National Steel Corporation, a corporation of Delaware Original No. 2,978,386, dated Apr. 4, 1961, Ser. No. 782,186, Dec. 22, 1958. Application for reissue Dec. 27, 1962, Ser. No. 248,844

16 Claims. (Cl. 202—1)

Figure 1:
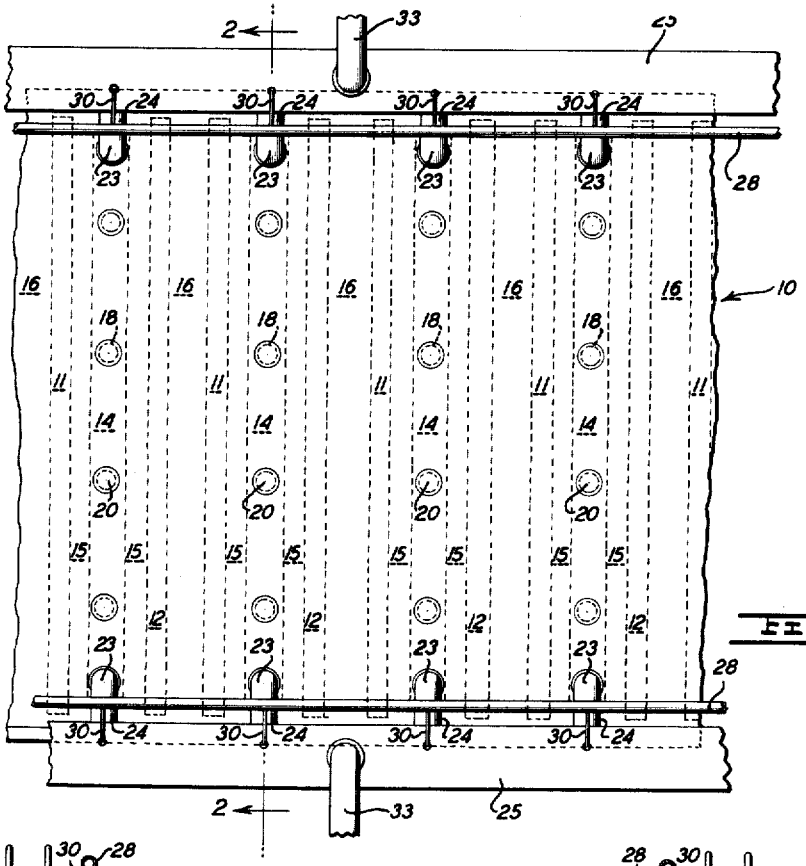

Matter enclosed in heavy brackets [ ] appears in the original patent but forms no part of this reissue specification; matter printed in italics indicates the additions made by reissue.

This invention relates to a method of preserving refractory materials and, in one of its more specific aspects, to a novel method of preserving refractory construction in a battery of by-product coke ovens during closedown periods.

The by-product process for carbonizing coal or other carbonaceous materials is a destructive distillation process involving the use of retort ovens of the type commonly referred to as by-product coke ovens. The detailed construction of different types of by-product coke ovens varies widely, but all modern constructions include three main portions. These three main portions are generally rectangular-shaped coking chambers which are tapered somewhat in width so as to be slightly wider on the coke side than on the pusher side and provided with refractory brick-lined doors at either end, heating chambers or flues which are constructed and arranged so as to assure that the contents of the coking chambers will be uniformly heated, and regenerative chambers for recovering heat from the waste gases and utilizing the recovered heat to preheat air for combustion of the fuel, all of which are constructed largely of silica brick or other suitable refractory brick.

In most modern batteries of by-product coke ovens, the coking chambers and flues are arranged so as to provide alternate coking chambers and flues on an upper level which are defined and separated by refractory brick walls, and the regenerative chambers are arranged on a lower level beneath the coking chambers and flues with the separating walls between regenerators serving as foundation walls for the coking chambers and flues. The regenerative chambers and flues are constructed and arranged so that air for combustion with gaseous fuel is preheated in a first series of hot regenerative chambers, passed to flues where a mixture of the preheated air and fuel is burned and passed in contact with the walls separating the flues and coking chambers so as to heat the same, and the products of combustion or waste gases are passed by flues to a second series of cold regenerative chambers whereby they are heated. On switching, the flow of gases is reversed. The second series of regenerative chambers formerly cold and being heated by waste gases but now hot are used to preheat the air for combustion, the preheated air passed to flues formerly used for passing waste gases to the second series of regenerative chambers and a mixture of gaseous fuel and the preheated air burned therein, and the products of combustion passed through flues formerly used for burning the mixture of fuel and preheated air to the first series of regenerative chambers, now cold, which were formerly used in preheating the air. The above described cycle is repeated as necessary in operating the battery.

The general construction and operation of a battery of by-product coke ovens to produce coke of a desired grade is well known in the art. For example, chapter 4 (pages 90–112) of the text "The Making, Shaping and Treating of Steel," seventh edition, published by the United States Steel Company, illustrates and describes the general construction and method of operating various types of modern by-product coke ovens, and especially coke ovens of the Koppers, Koppers-Becker, Wilputte and Semet-Solvay types. The principles of the present invention are useful in preserving the good working properties and refractory work of any of these types of ovens, as well as other types, and usually without requiring extensive modification in preparation for closing down the operating battery.

In general, modern by-product coke ovens are relatively thick-walled, massive masonry structures which are largely of high-grade, silica-brick refractory construction. Since silica brick has a high coefficient of thermal expansion at temperatures lower than normal operating temperature, when starting up an old battery which has been allowed to cool or a new battery, it is essential that great care be exercised in bringing the battery up to a satisfactory carbonization temperature. The gradual heating up of a cold battery to the required carbonizing temperature must be sufficiently slow so as to insure maximum temperature equilization through the entire massive refractory construction and, in actual practice, this requires at least four to six weeks and often longer, such as up to ten to eleven weeks for some new batteries. This same procedure must be followed in reverse when an operating battery is closed down in accordance with prior art practice and cooled to ambient temperature.

The minimum period required for heating up a cold battery to the required carbonizing temperature or cooling down an operating battery to ambient temperature cannot be safely reduced without excessive damage to the refractory construction. Thus, a minimum total heating and cooling period of at least two to three months, and often considerably longer, has been required heretofore to discontinue the production of coke and close down an operating battery, and then place the same battery back in operation to produce coke. This costly, time-consuming procedure alone is enough to make continuous operation of a battery over its useful life highly desirable. Thus, preferably, an operating battery is never closed down and cooled to ambient temperature if it can be avoided. In instances where economic or other conditions make continued operation impractical, in accordance with the usual prior art practice, the coke is first pushed from the coking chambers to avoid sticking therein upon cooling, and then the battery is gradually cooled from about the carbonization temperature to approximately ambient temperature over the required minimum period of at least four to six weeks. The resulting cold battery must be slowly heated up to carbonization temperature as above described before production of coke can commence.

The above-mentioned method and other prior art methods of closing down an operating battery of by-product coke ovens have a number of extremely undesirable features and disadvantages. For example, however slowly and carefully the cooling down and heating up periods are conducted, there is at best a considerable amount of structural damage to the refractory construction. This is especially true of older batteries which have been in operation for a period of years and then cooled down to ambient temperature for a sufficient period of time to allow air and moisture to accumulate in the refractory work. The more common forms of structural damage due to the above are cracks or step joints which are opened up in the refractory construction and loss of mortar from the masonry. This destroys the air-tight integrity of the coking chambers thereby allowing flue gases and air to enter, and the necessary repairs to correct such damage before resuming coking operations are often time-consuming and costly. Also, the entrance of air or flue gases through cracks and defective mortar joints and the accumulation of air-fuel mixtures in the coking chambers constitute an explosion hazard which must be avoided whenever possible. In addition, the good working properties of the ovens that are the result of a long period of careful operation and upkeep and which assure air-tight coking chambers, ease of pushing the coke and trouble-free operation in general, invariably deteriorate. Thus, upon placing the battery back in operation, an extended period of difficult operation is experienced before the good working properties are regained and the battery is operating satisfactorily once again.

In addition to the above-mentioned damage to the refractory construction and loss of the good working properties of the ovens, still other damage occurs in auxiliary equipment such as the by-product gas handling equipment. Corrosion often is a problem during the closedown period and is accelerated due in part to the presence of moisture which condenses and collects in the cold equipment. Also, contraction upon cooling to ambient temperature and expansion upon heating to carbonization temperature often results in additional damage. Further, since a minimum period of four to six weeks is required to heat a battery from ambient temperature to carbonization temperature, it is not possible to place the battery back in production immediately when economic or other conditions are favorable and the normal production of coke for the four-to-six-week period is lost. The loss of coke production over so long a period of time, especially when taken with the high cost of repairs and general expense of cooling down and heating up the battery, results in a combined loss which is so high as to render the prior art methods of closing down coke oven batteries uneconomic. However, heretofore no satisfactory method has been available to the industry even though the need has been long recognized by those skilled in the art.

The present invention provides a method of preserving refractory construction in a battery of by-product coke ovens during closedown periods which overcomes the above-mentioned disadvantages of the prior art methods. The method of the present invention perfectly preserves the refractory construction, the good working properties characteristic of an operating battery which has received proper attention, and even may reduce damage and corrosion in the gas handling equipment and other auxiliary equipment. Patching and upkeep in general which is attributable directly to closing down of the battery is greatly reduced, and a substantial amount of repair work generally is not necessary at the time of resuming coking operations. Also, the present invention is especially effective in protecting old batteries which are much more subject to damage during closedown periods and the method of the invention is very satisfactory for old batteries even when the prior art methods cannot be used. The present invention has the additional advantage of completely eliminating the explosion hazard characteristic of the prior art methods. Even more important, the invention allows completely flexibility in the production of coke by means of by-product coke oven batteries for the first time in the history of the art since a battery may be closed down or coke production resumed almost immediately at any time. Thus, the present invention is a major advance in the art which is not contemplated or even remotely suggested by the prior art methods.

It is an object of the present invention to provide a novel method of preserving the refractory work of a battery of by-product coke ovens during a closedown period.

It is a further object of the present invention to provide a novel method of closing down a battery of by-product coke ovens over any desired period of time which does not require extensive modification of existing equipment and whereby the ovens may be maintained in perfect condition.

It is still a further object of the present invention to provide a novel method of closing down a battery of by-product coke ovens which reduces the explosion hazard, prevents deterioration of the good working properties characteristic of properly operating ovens, and substantially reduces patching and upkeep in general during the closedown period.

It is still a further object of the present invention to provide a novel method of closing down a battery of by-product coke ovens over an extended period of time whereby the battery may be placed back in operation on short notice and without the necessity for extensive repairs or a prolonged period of heating to a satisfactory carbonization temperature.

It is a further object of the present invention to provide a novel method of closing down a battery of by-product coke ovens which allows the battery to be placed in and out of operation on short notice thereby rendering the coking operation completely flexible and which is especially suited for preserving the refractory work and preventing deterioration of the good working properties of older batteries.

Figure 2:
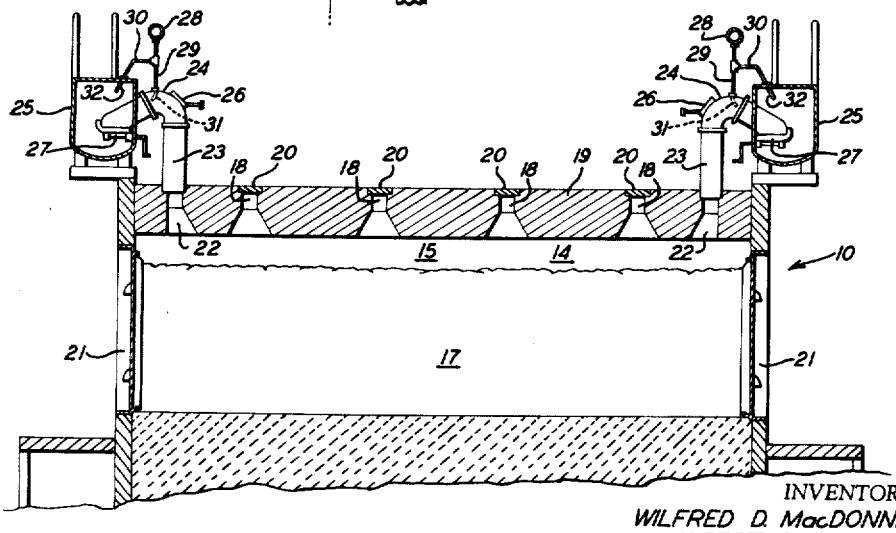

Still other objects of the present invention and the attendant advantages will be apparent to those skilled in the art upon reference to the following detailed description and the drawings wherein:

FIGURE 1 is a diagrammatic plan view of a prior art coke oven battery, with end portions thereof broken away in the interest of simplicity and clarity, illustrating in a general manner a satisfactory arrangement of coking chambers, flues and gas collecting apparatus for practicing the present invention without the necessity for extensive modification in preparation for the closedown period; and FIGURE 2 is a diagrammatic cross-sectional view in elevation through an oven chamber taken along the line 2—2 of FIGURE 1 with the major proportion of the coke oven battery construction beneath the coking chamber being broken away in the interest of simplicity and clarity.

Referring now to the drawings, the prior art battery of coke ovens generally designated as 10 is provided with a plurality of horizontal flues 11 and 12 arranged on either side of coking chambers 14 and separated by coking chamber walls 15. The horizontal flues 11 and 12 are separated by refractory walls 16. Coking chambers 14 may be charged with a carbonaceous material 17 such as coal through a plurality of charging holes 18 extending through roof 19. Charging holes 18 are provided with tightly fitting plates 20 which are in place during the coking operation, as are the refractory lined doors 21 closing either end of coking chambers 14. The coking chambers 14 are heated to a desired carbonization temperature in the usual manner, i.e., by combustion of an air-fuel mixture in the flues 11 and 12. The desired carbonization temperature in the coking chambers may vary depending upon the end use of the coke but, in the production of metallurgical coke, usually a maximum final temperature at the end of the coking period of about 1900–2000° F. is used. The temperature of the hot gaseous products of combustion passing through the flues may be about 2300–2700° F.

The volatile products produced upon heating the carbonaceous charge 17 pass upward into outlets 22 in either end of the roof 19, and then through stand pipes 23 and goose necks 24 into collecting mains 25. The goose necks 24 are provided with elbow covers 26 and damper valves 27 through which the volatile products pass into collecting mains 25. Flushing liquor is supplied via flushing liquor header 28 and conduits 29 and 30 to spray nozzle 31 and 32 in goose necks 24 and collecting mains 27, respectively. The flushing liquor is intimately contacted with volatile products in the usual manner, first in goose necks 24 and then in collecting mains 27, for the purpose of cooling the volatile products and removing several of the constituents. The remaining gaseous constituents pass from collecting mains 25 through cross-over mains 33 and are withdrawn through the usual suction mains in communication therewith with the aid of exhausters. The gaseous constituents may be passed through condensers, etc., for further prior art treatment and removal of additional constituents. The prior art suction mains, exhausters, condensers, or other apparatus for handling or treating the volatile products after leaving cross-over mains 33, as well as the regenerative chambers, air and fuel intakes, waste gas outlets, and other associated apparatus conventionally used or present in coke ovens, are not shown in the drawings in the interest of clarity and simplicity.

The battery of coke ovens 10 is operated in such a manner that the carbonized carbonaceous material is periodically pushed from a given coking chamber 14 at the end of a satisfactory coking period and then shortly thereafter the empty coking chamber is recharged with uncoked carbonaceous material. Thus, while the process is batch-wise with respect to a given coking chamber 14, it may be considered as being substantially continuous with respect to the entire battery 10 since in normal operation one of the coking chambers is being pushed and recharged at all times. Once the battery 10 has been slowly and carefully heated up from ambient temperature to carbonizing temperature over the required period of weeks, due to the previously discussed limitations and disadvantages inherent in methods available heretofore for closing down coke oven batteries, the battery 10 is not closed down and continuously produces coke during its useful life of twenty to thirty years or longer unless continued operation becomes impractical for economic or other reasons.

In normal operation of the battery of coke ovens 10 to produce metallurgical coke from coking coal, a suitable flue temperature, e.g., 2350–2650° F. is maintained as necessary in flues 11 and 12 to provide a satisfactory carbonizing temperature such as 1900–2000° F. in the vicinity of the surface of walls 15 contacting coal charges 17 in coking chambers 14. Shortly after pushing the coke from a given coking chamber 14, the doors are replaced in substantially air-tight relationship with the jambs, the plates 20 covering charging holes 18 removed, and the empty coking chamber charged with finely divided coal which is usually a mixture of several coals designed to give good coking properties in the resulting blend. The plates 18 are replaced, the charge of coal 17 leveled, and then allowed to heat in the absence of air from about ambient temperature up to a satisfactory carbonizing temperature. The exact carbonization temperature and period of heating will vary depending upon the design of the battery, the nature of the desired coke product, and other factors, but generally a maximum temperature of about 1900–2000° F. over a period of 16–20 hours will produce satisfactory metallurgical coke. During the coking period, as the coal is heated it becomes plastic at about 650–900° F. and forms a fused mass regardless of its original form in the charge. Volatile products are given off rapidly during the first stages of heating and then the rate decreases until, at about 1750–2000° F., only a small amount of volatile matter remains in the resultant solid mass of coke. The doors 21 closing either end of coking chamber 14 are removed, the coke pushed from the coking chamber 14, the doors 21 replaced and the empty coking chamber 14 charged with coking coal 17, and the above process repeated for each of the coking chambers 14 until it is eventually necessary to close down the coke oven battery 10.

In accordance with one embodiment of the present invention, the battery of coke ovens 10 is closed down and the production of coke discontinued for any desired period of time while preserving the refractory construction and good working properties of the ovens by heating the coking chambers during the close-down period to maintain a temperature in the coking chamber walls of at least about 1100° F. and not exceeding the critical temperature of the refractory construction, and maintaining a non-oxidizing atmosphere within the coking chambers during the closedown period.

If desired, the coke may be pushed from the coking chambers preparatory to closing down the battery. However, in instances where it is preferred, the coke is not disturbed and may be allowed to remain in place. The coke generally should not be allowed to remain in the coking chambers over about three to four weeks for best results, but it may be pushed, the coking chamber recharged with coal, and the three to four weeks' residence time repeated as long as necessary. In instances where the battery is to be closed down for an extremely long period of time, it may be preferred to push the coke and perform necessary patching and sealing to assure substantially air-tight oven chambers, and then the ovens may be closed down for as long as necessary with a minimum of attention.

The heating of the coking chambers may be most conveniently accomplished by following substantially normal operating firing practice modified somewhat to take into account the reduced heating requirements for maintaining the desired temperature. For example, the heating may be accomplished by combustion of an air-fuel mixture in the flues or by otherwise passing a hot gaseous mixture through the flues. The temperature in the coking chamber walls must not be allowed to fall below about 1100° F. but much higher temperatures are very satisfactory although the fuel requirement may be excessive at extremely high temperatures. Also, the temperature must not be allowed to exceed the critical temperature of the refractory construction, i.e., it must be less than that temperature at which the refractory construction fails under the elevated temperature conditions. For most batteries of predominantly silica brick refractory construction, a temperature range of about 1100–2700° F. and not exceeding the critical temperature of the refractory construction is satisfactory. However, temperatures below about 1600° F. are not generally preferred where it is necessary to place the battery back into operation on short notice. A highly satisfactory temperature range which allows the battery to be placed back into operation on reasonable notice and yet which does not require excessive quantities of fuel is about 1600–2100° F. For best results within this range, the temperature should be maintained at about 1800° F.

It is essential that a non-oxidizing and, preferably, a reducing atmosphere be maintained in the coking chambers during the closedown period. This may be accomplished by providing therein any suitable non-oxidizing or reducing substance which is gaseous at the temperature of the coking chambers. One of the more convenient methods of assuring a non-oxidizing atmosphere is by supplying a normally gaseous non-oxidizing or reducing substance to the coking chamber in an amount sufficient to maintain the necessary non-oxidizing or reducing atmosphere therein. The preferred normally gaseous substances are reducing agents such as coke oven gas, blast furnace gas, natural gas and normally gaseous hydrocarbons. However, other than normally gaseous substances may be used. For example, normally liquid hydrocarbons may be used such as kerosene or hydrocarbons in general which are gaseous at the temperature of the coking chambers although some cracking tends to take place in some instances accompanied by deposition of carbon black in the coking chambers. Surprisingly, it appears that little cracking occurs when coke oven gas, blast furnace gas, natural gas or normally gaseous hydrocarbons are used.

The coking chambers should be maintained under a superatmospheric pressure at least as high as the pressure existing within the flues for preferred results. For best results, the coking chambers should be maintained under a superatmospheric pressure of about 1–5 millimeters of water and, preferably, 1–3 millimeters of water.

One of the more convenient methods of assuring that a non-oxidizing atmosphere is maintained in the coking chambers 14 of a battery of ovens 10 such as illustrated in the drawings is by introducing under pressure, countercurrently to normal by-product gas flow, a readily available reducing gas such as coke oven gas, blast furnace gas, natural gas or normally gaseous hydrocarbons, into the by-product gas handling equipment so as to pressurize, for example, suction, cross-over, and collecting mains as well as the coking chambers. This arrangement aids in maintaining the by-product gas handling equipment free of condensed moisture and thus reduces corrosion from this source.

The present invention is illustrated and described herein in the environment of a battery of by-product coke ovens. However, while the invention provides a method which is especially effective in preserving the refactory work of a battery of by-product coke ovens during closedown periods, it is expressly understood that the principles to be described hereinafter may be applied in preserving refractory materials in general which are subjected to similar adverse conditions.

The foregoing detailed description and the following specific examples are intended for purposes of illustration only and are not limiting to the spirit or scope of the appended claims.

EXAMPLE I

This example specifically illustrates the embodiment of the present invention wherein the coke is first pushed from the ovens and then the ovens are closed down.

The following steps were performed in preparation for closedown:

(1) Expansion joints on the collecting mains were freed and lubricated;

(2) Stand pipe joints at the top of the battery of ovens were freed to allow for contraction of the collecting mains;

(3) Flushing liquor header ties, collecting mains, hand railings and adjacent deck plating were freed to allow for contraction.

Individual coking chambers of a 73 oven battery were pushed empty at about 20 minute intervals. As each oven was pushed, the jambs and cracks on both pusher and coke sides were sprayed with Plibricko Mix No. 27, i.e., a prior art patching material well known in the art for coke oven patching purposes, using a Quigley spray patching gun. After spray patching, the doors were replaced.

When the above was accomplished, surplus coke oven gas was introduced under pressure, countercurrent to normal gas flow, through the by-product gas handling equipment to pressurize suction, cross-over and collecting mains. The coking chambers were pressurized from the collecting mains to provide a pressure one foot from the floor of 1–5 millimeters of water. Gooseneck and collecting main spray nozzles as well as the steam supply for decarbonizing and charging the coking chambers were closed off at their respective headers. The flushing liquor headers were drained, while the steam headers were pressurized and bled.

The firing of the ovens, in general, followed normal operating practice except for somewhat lower temperatures being used. Average flue temperatures of 1700–2000° F. were maintained. The rate of flow of reducing gas through the coking chambers of the battery was 6,000–13,000 cubic feet per hour.

The coking chambers were observed over a period of several months and showed no indication of damage to the refractory work. When the ovens were placed back in operation, extensive repairs were not necessary and almost immediate normal coke production was possible without the usual starting up difficulties. Thus, the method of the present invention allows truly flexible operation of coke oven batteries for the first time in addition to being highly effective in preserving the refractory construction and good working properties of the ovens.

EXAMPLE II

The procedure of Example I was followed with the exception that the coke was not pushed from the coking chambers and coke oven doors or covers for openings leading directly to the coking chambers were not disturbed; all other steps were followed as outlined in Example I. In addition to the Example I practice, the ovens were pushed free of coke at three to four week intervals and then recharged with coal.

The results of this example were the same as in Example I.

What is claimed is:

1. A method of preserving refractory construction in a battery of by-product coke ovens during a closedown period, the battery of coke ovens including coking chambers and flues separated by walls of refractory construction, which comprises the steps of heating the coking chambers at an elevated temperature during the closedown period, the temperature of the coking chamber walls being about 1000–2700° F. and not exceeding the critical temperature of the refractory construction, and [maintaining a non-oxidizing atmosphere within] *introducing into* the coking chambers *from an extraneous source a substance which is gaseous and non-oxidizing at the temperature of the coking chambers to thereby maintain a non-oxidizing atmosphere within the coking chambers* during the closedown period.

2. A method of preserving refractory construction in a battery of by-product coke ovens during a closedown period, the battery of coke ovens including coking chambers and flues separated by walls of refractory construction, which comprises the steps of heating the coking chambers at an elevated temperature during the closedown period by passing a hot gaseous medium through the flues, the temperature of the coking chamber walls being at least about 1600° F. and not exceeding about 2100° F., and [maintaining a non-oxidizing atmosphere within] *introducing into* the coking chambers *from an extraneous source a substance which is gaseous and non-oxidizing at the temperature of the coking chambers to thereby maintain a non-oxidizing atmosphere within the coking chambers* during the closedown period [by supplying thereto a non-oxidizing substance which is gaseous at the temperature of the coking chambers], the coking chambers being under a superatmospheric pressure at least as high as the pressure existing within the flues.

3. A method of preserving refractory construction in a battery of by-product coke ovens during a closedown period, the battery of coke ovens including coking chambers and flues separated by walls of refractory construction, which comprises the steps of heating the coking chambers at an elevated temperature during the closedown period, the temperature of the coking chamber walls being about 1100–2700° F. and not exceeding the critical temperature of the refractory construction, and [maintaining a reducing atmosphere within] *introducing into* the coking chambers *from an extraneous source a substance which is gaseous and reducing at the temperature of the coking chambers to thereby maintain a reducing atmosphere within the coking chambers* during the closedown period.

4. A method of preserving refractory construction in a battery of by-product coke ovens during a closedown period, the battery of coke ovens including coking chambers and flues separated by walls of refractory construction, which comprises the steps of heating the coking chambers at elevated temperature during the closedown period by passing a hot gaseous medium through the flues, the temperature of the coking chamber walls being at least about 1600° F. and not exceeding about 2100° F., and [maintaining a reducing atmosphere within] *introducing into* the coking chambers *from an extraneous source a substance which is gaseous and reducing at the temperature of the coking chambers to thereby maintain a reducing atmosphere within the coking chambers* during the closedown period [by supplying thereto a reducing substance which is gaseous at the temperature of the coking chambers], the coking chambers being under a superatmospheric pressure at least as high as the pressure existing within the flues.

5. A method of preserving refractory construction in a battery of by-product coke ovens during a closedown period, the battery of coke ovens including coking chambers and flues separated by walls of refractory construction, *the ovens having openings in communication with conduit means leading out of the coking chambers through which by-product gas passes during production of coke in the battery of coke ovens, the ovens having openings in the coking chambers other than the openings for passage of by-product gas,* which comprises the steps of *sealing openings in the coking chambers other than the openings for passage of by-product gas,* heating the coking chambers at an elevated temperature during the closedown period by passing a hot gaseous medium through the flues, the temperature of the coking chamber walls being at least about 1600° F. and not exceeding about 2100° F., and [maintaining a reducing atmosphere within] *introducing into the conduit means and* the coking chambers [during the closedown period by supplying thereto a reducing] *from an extraneous source a* substance which is gaseous *and reducing* at the temperature of the coking chambers *to thereby maintain a reducing atmosphere within the coking chambers during the closedown period,* the coking chambers being under a superatmospheric pressure of about 1–5 millimeters of water [with] *and* the pressure being at least as great as the pressure existing within the flues.

6. A method of preserving refractory construction in a battery of by-product coke ovens during a closedown period, the battery of coke ovens including coking chambers and flues separated by walls of refractory construction, which comprises the steps of removing the coke from the ovens, heating the coking chambers at an elevated temperature during the closedown period, the temperature of the coking chamber walls being about 1100–2700° F. and not exceeding the critical temperature of the refractory construction, and maintaining a non-oxidizing atmosphere within the coking chambers during the closedown period.

7. A method of preserving refractory construction in a battery of by-product coke ovens during a closedown period, the battery of coke ovens including coking chambers and flues separated by walls of refractory construction, which comprises the steps of removing the coke from the ovens, heating the coking chambers at an elevated temperature during the closedown period by passing a hot gaseous medium through the flues, the temperature of the coking chamber walls being at least about 1600° F. and not exceeding about 2100° F., and [maintaining a non-oxidizing atmosphere within] *introducing into* the coking chambers *from an extraneous source a substance which is gaseous and non-oxidizing at the temperature of the coking chambers to thereby maintain a non-oxidizing atmosphere within the coking chambers* during the closedown period [by supplying thereto a non-oxidizing substance which is gaseous at the temperature of the coking chambers], the coking chambers being under a superatmospheric pressure at least as high as the pressure existing within the flues.

8. A method of preserving refractory construction in a battery of by-product coke ovens during a closedown period, the battery of coke ovens including coking chambers and flues separated by walls of refractory construction, which comprises the steps of removing the coke from the ovens, heating the coking chambers at an elevated temperature during the closedown period, the temperature of the coking chamber walls being about 1100–2700° F. and not exceeding the critical temperature of the refractory construction, and maintaining a reducing atmosphere within the coking chambers during the closedown period.

9. A method of preserving refractory construction in a battery of by-product coke ovens during a closedown period, the battery of coke ovens including coking chambers and flues separated by walls of refractory construction, which comprises the steps of removing the coke from the ovens, heating the coking chambers at an elevated temperature during the closedown period by passing a hot gaseous medium through the flues, the temperature of the coking chamber walls being at least about 1600° F. and not exceeding about 2100° F., and [maintaining a reducing atmosphere within] *introducing into* the coking chambers *from an extraneous source a substance which is gaseous and reducing at the temperature of the coking chambers to thereby maintain a reducing atmosphere within the coking chambers* during the closedown period [by supplying thereto a reducing substance which is gaseous at the temperature of the coking chambers], the coking chambers being under a superatmospheric pressure at least as high as the pressure existing within the flues.

10. A method of preserving refractory construction in a battery of by-product coke ovens during a closedown period, the battery of coke ovens including coking chambers and flues separated by walls of refractory construction, *the ovens having openings in communication with conduit means leading out of the coking chambers through which by-product gas passes during production of coke in the battery of coke ovens, the ovens having openings in the coking chambers other than the openings for passage of by-product gas,* which comprises the steps of removing the coke from the ovens, *sealing openings in the coking chambers other than the openings for passage of by-product gas,* heating the coking chambers at an elevated temperature during the closedown period by passing a hot gaseous medium through the flues, the temperature of the coking chamber walls being at least about 1600° F. and not exceeding about 2100° F., and [maintaining a reducing atmosphere within] *introducing into the conduit means and* the coking chambers *from an extraneous source a substance which is gaseous and reducing at the temperature of the coking chambers to thereby maintain a reducing atmosphere within the coking chambers* during the closedown period [by supplying thereto a reducing substance which is gaseous at the temperature of the coking chambers], the coking chambers being under a superatmospheric pressure of about 1–5 millimeters of water [with] *and* the pressure being at least as great as the pressure existing within the flues.

11. A method of preserving refractory construction in a battery of by-product coke ovens during a closedown period, the battery of coke ovens including coking chambers and flues separated by walls of refractory construction, which comprises the steps of heating the coking chambers at an elevated temperature during the closedown period, the temperature of the coking chamber walls being about 1100–2700° F. and not exceeding the critical temperature of the refractory construction, and [maintaining a reducing atmosphere within] *introducing into* the coking chambers [during the closedown period by supplying thereto] *from an extraneous source* at least one [reducing] gas *which is reducing at the temperature of the coking chambers* selected from the class consisting of coke oven gas, blast furnace gas, natural gas and normally gaseous hydrocarbons *to thereby maintain a reducing atmosphere within the coking chambers during the closedown period.*

12. A method of preserving refractory construction in a battery of by-product coke ovens during a closedown period, the battery of coke ovens including coking chambers and flues separated by walls of refractory construction, *the ovens having openings in communication with conduit means leading out of the coking chambers through which by-product gas passes during production of coke in the battery of coke ovens, the ovens having openings in the coking chambers other than the openings for passage of by-product gas,* which comprises the steps of *sealing openings in the coking chambers other than the openings for passage of by-product gas,* heating the coking chambers at an elevated temperature during the closedown period by passing a hot gaseous medium through the flues, the temperature of the coking chamber walls being at least about 1600° F. and not exceeding about 2100° F., and [maintaining a reducing atmosphere within] *introducing into the conduit means and* the coking chambers [during the closedown period by supplying thereto] *from an extraneous source* at least one [reducing] gas *which is reducing at the temperature of the coking chambers* selected from the class consisting of coke oven gas, blast furnace gas, natural gas, and normally gaseous hydrocarbons *to thereby maintain a reducing atmosphere within the coking chambers during the closedown period,* the coking chambers being under a superatmospheric pressure at least as high as the pressure existing within the flues.

13. A method of preserving refractory construction in a battery of by-product coke ovens during a closedown period, the battery of coke ovens including coking chambers and flues separated by walls of refractory construction, *the ovens having openings in communication with conduit means leading out of the coking chambers through which by-product gas passes during production of coke in the battery of coke ovens, the ovens having openings in the coking chambers other than the openings for passage of by-product gas,* which comprises the steps of *sealing openings in the coking chambers other than the openings for passage of by-product gas,* heating the coking chambers at an elevated temperature during the closedown period by passing a hot gaseous medium through the flues, the temperature of the coking chamber walls being at least about 1600° F. and not exceeding about 2100° F., and [maintaining a reducing atmosphere within] *introducing into the conduit means and* the coking chambers [during the closedown period by supplying thereto] *from an extraneous source* at least one [reducing] gas *which is reducing at the temperature of the coking chambers* selected from the class consisting of coke oven gas, blast furnace gas, natural gas and normally gaseous hydrocarbons *to thereby maintain a reducing atmosphere within the coking chambers during the closedown period,* the coking chambers being under a superatmospheric pressure of about 1–5 millimeters of water [with] *and* the pressure being at least as great as the pressure existing within the flues.

14. A method of preserving refractory construction in a battery of by-product coke ovens during a closedown period, the battery of coke ovens including coking chambers and flues separated by walls of refractory construction, which comprises the steps of removing the coke from the ovens, heating the coking chambers at an elevated temperature during the closedown period, the temperature of the coking chamber walls being about 1100–2700° F. and not exceeding the critical temperature of the refractory construction, and maintaining a reducing atmosphere within the coking chambers during the closedown period by supplying thereto at least one reducing gas selected from the class consisting of coke oven gas, blast furnace gas, natural gas and normally gaseous hydrocarbons.

15. A method of preserving refractory construction in a battery of by-product coke ovens during a closedown period, the battery of coke ovens including coking chambers and flues separated by walls of refractory construction, which comprises the steps of removing the coke from the ovens, heating the coking chambers at an elevated temperature during the closedown period by passing a hot gaseous medium through the flues, the temperature of the coking chamber walls being at least about 1600° F. and not exceeding about 2100° F., and [maintaining a reducing atmosphere within] *introducing into* the coking chambers [during the closedown period by supplying thereto] *from an extraneous source* at least one [reducing] gas *which is reducing at the temperature of the coking chambers* selected from the class consisting of coke oven gas, blast furnace gas, natural gas and normally gaseous hydrocarbons *to thereby maintain a reducing atmosphere within the coking chambers during the closedown period,* the coking chambers being under a superatmospheric pressure at least as high as the pressure existing within the flues.

16. A method of preserving refractory construction in a battery of by-product coke ovens during a closedown period, the coke oven battery including coking chambers and flues separated by walls of refractory construction, *the ovens having openings in communication with conduit means leading out of the coking chambers through which by-product gas passes during production of coke in the battery of coke ovens, the ovens having openings in the coking chambers other than the openings for passage of by-product gas,* which comprises the steps of removing the coke from the ovens, *sealing openings in the coking chambers other than the openings for passage of by-product gas,* heating the coking chambers at an elevated temperature during the closedown period by passing a hot gaseous medium through the flues, the temperature of the coking chamber walls being at least about 1600° F. and not exceeding about 2100° F., and [maintaining a reducing atmosphere within] *introducing into the conduit means and* the coking chambers [during the closedown period by supplying thereto] *from an extraneous source* at least one [reducing] gas selected from the class consisting of coke oven gas, blast furnace gas, natural gas and normally gaseous hydrocarbons *to thereby maintain a non-oxidizing atmosphere within the conduit means and the coking chambers during the closedown period,* the coking chambers being under a superatmospheric pressure of about 1–5 millimeters of water [with] *and* the pressure being at least as great as the pressure existing within the flues.

References Cited in the file of this patent or the original patent

Industrial Furnaces, Trinks, John Wiley & Sons, New York, (1934), vol. I, 3rd Ed., page 257.

Blast Furnace and Steel Plant, vol. 39 (February 1951), pages 203–213.